United States Patent Office 3,658,732

Patented Apr. 25, 1972

1

3,658,732

VULCANIZED ELASTOMERIC COMPOSITIONS HAVING IMPROVED RESISTANCE AGAINST AIR-OXIDATION AND METHOD FOR MAKING SAME

Giuliano Ballini and Luciano Baldi, Ferrara, Italy, assignors to The B. F. Goodrich Company, Akron, Ohio No Drawing. Filed Oct. 10, 1969, Ser. No. 865,516
Claims priority, application Italy, Oct. 14, 1968, 22,473/68
Int. Cl. C08c *9/08;* C08d *9/08*
U.S. Cl. 260—5 14 Claims

ABSTRACT OF THE DISCLOSURE

Vulcanized elastomeric compositions having improved resistance against air-oxidation are prepared by:

(A) reacting (1) an ethylene/alphaolefin/diene terpolymer, wherein the diene is selected from the group consisting of 1,4-trans-hexadiene, 2-methallyl-5-norbornene, 2-methylene-5-norbornene, 2-ethylidene-5-norbornene, 6-methyl-4,7,8,9-tetrahydroindene and 5,6-dimethyl-4,7,8,9-tetrahydroindene, with (2) from about 0.01 to 0.5% by weight based on said terpolymer of an organic peroxide;

(B) admixing the reacted terpolymer with an unsaturated elastomer; and (C) subjecting this admixture to conventional vulcanizing conditions.

BACKGROUND OF THE INVENTION

Field of the invention

The present invention pertains to the field of vulcanized elastomeric compositions.

More particularly, this invention relates to a process for obtaining vulcanized elastomeric compositions having an improved resistance against air-oxidation, particularly against oxidation caused by ozone, without substantially modifying their mechanical properties and in particular without impairing their capacity to adhere to other diene rubber compositions.

This invention also relates to the vulcanized elastomeric compositions obtained by the above-mentioned process.

DESCRIPTION OF THE PRIOR ART

Vulcanized elastomeric compositions comprising diene-type rubbers, which are stabilized against ageing and oxidation, are well-known in the art. These elastomers possess desirable adhesive properties and are generally bonded to other types of rubber or to natural and synthetic textile fibers for use in products such as, for example, automobile tires, transmission belts, conveyor belts, gaskets, hoses and the like. However, almost all of the known antioxidants possess the disadvantage of darkening the vulcanized composition, thus making them unsuitable for use in those applications wherein light coloring is desired, as for instance, in the production of white side-wall automobile tires.

The foregoing problems can be overcome, for example, as disclosed in Dutch patent application 67/03,535, by using compositions which comprise a conventional natural or synthetic diene rubber blended with from 10 to 35% by weight thereof of a terpolymer obtained by copolymerization of two different mono-olefins with dicyclopentadiene.

Such elastomeric compositions are highly resistant to ageing and oxidative degradation and thus do not require the addition of antioxidants thereto. Consequently, the darkening of the compositions during vulcanization, heretofore caused by the presence of antioxidants, is avoided.

2

The same Dutch patent application teaches that terpolymers, obtained by polymerizing two different olefins (such as ethylene and propylene) with dicyclopentadiene as the third monomer, afford, in admixture with diene elastomers, good antioxidant properties, while those terpolymers containing diene monomers different from dicyclopentadiene do not show such properties.

SUMMARY OF INVENTION

We have now surprisingly found that terpolymers obtained by copolymerizing two different mono-olefins with a diene wherein the diene is selected from the group consisting of 1,4-trans-hexadiene, 6-methyl-4,7,8,9-tetrahydroindene, 5,6-dimethyl-4,7,8,9-tetrahydroindene, 2-methylene-5-norbornene, 2-ethylidene - 5 - norbornene and 2-methallyl-5-norbornene, which terpolymers do not display any antioxidant property when in admixture with unsaturated elastomers, become effective antioxidants by partially reacting said terpolymers with organic peroxides and thereafter mixing these treated terpolymers with unsaturated elastomers.

Thus, according to one of its aspects, this invention relates to a process for obtaining vulcanizable elastomeric compositions which, when vulcanized, have resistance against the oxidative degradation caused by ozone and the like, said process comprising:

(A) reacting a terpolymer obtained by copolymerizing two different mono-olefins, generally ethylene and a higher alphaolefin, such as ethylene and propylene or ethylene and butene-1, with a diene selected from the group consisting of 1,4-trans-hexadiene, 6-methyl-4,7,8,9-tetrahydroindene, 5,6-dimethyl-4,7,8,9-tetrahydroindene, 2-methallyl-5-norbornene, 2-ethylidene-5-norbornene, 2-methylene-5-norbornene with amounts of from about 0.01 to 0.5% by weight based on said terpolymer of an organic peroxide, at a temperature which is sufficient for decomposing the peroxide;

(B) mixing at least 70 parts by weight of an unsaturated elastomer with up to about 30 parts of said treated terpolymers. Thereafter, conventional additives such as vulcanizing agents, accelerators, stabilizers, carbon black charges, sulfur, and the like are added and this mixture is vulcanized by conventional methods.

According to another of its aspects, this invention also relates to vulcanized elastomeric compositions having both excellent antioxidant and adhesion characteristics, prepared by the foregoing process.

DESCRIPTION OF THE PREFERRED EMBODIMENTS

We have found that a particularly suitable terpolymer for use in the process of our invention, is that obtained by copolymerizing ethylene, propylene and 6-methyl-4,7,8,9-tetrahydroindene. This terpolymer, its preparation and characteristics, have been disclosed in several commonly assigned patents, for instance in Italian Pat. 678, 563.

Suitable peroxides include the commonly known mono-, di- or tetra-peroxides, preferably alpha-alpha'-dicumyl-peroxide, alpha-cumyl-tert-butyl-peroxide and alpha-alpha'-bis-(tert-butyl-peroxy-)-di-isopropylbenzene.

We have found that unsaturated elastomers which may advantageously be protected against oxidative attack of ozone by the process of our invention include natural rubber, polybutadiene in all its various isomeric forms and in particular polybutadiene containing more than 30% of cis-isomer, polyisoprene, the butadiene-styrene rubbers, the butadiene-acrylonitrile rubbers, polychloroprene and the copolymers of butadiene with an ester of an unsaturated carboxylic acid, as, for instance, butadiene-butyl-acrylate copolymers, butadiene-dibutylfumarate copolymers and the like, or mixtures thereof. For example, particularly suitable for use as elastomers are mixtures containing 50 parts by weight of natural rubber (smoked sheets) and 50 parts by weight of butadiene-styrene elastomer. The vulcanized compositions obtained therefrom in accordance with this invention exhibited excellent resistance against brittleness and cracks, as well as satisfactory adhesion in vulcanization, and thus are particularly suited for the production of tires as well as other shaped articles such as, for example, conveyor belts, transmission belts, hoses, gaskets and the like.

The following examples will further illustrate this invention:

Example 1

4 liters of propylene and 400 grams of 6-methyl-4,7,8,9-tetrahydroindene, hereinbelow referred to as MTHI, were introduced into a 6 liter stainless steel autoclave, provided with a comb-stirrer, a bottom discharge device and an outside liquid ammonia cooling system. This mixture was cooled to −10° C. and ethylene was then introduced until a concentration in the liquid phase of about 7–8% was reached.

A 5% toluene solution of 0.36 g. of $V(Ac)_3$ (vanadium triacetylacetonate) and a 15% heptane solution of 0.96 g. of $Al(C_2H_5)_2Cl$ were then introduced into the autoclave. Then, 0.30 g. of $Zn(C_2H_5)_2$ were added as a molecular weight regulator. The temperature was maintained at −10° C. and the ethylene was fed in in such a way as to keep its liquid phase concentration constant.

After one hour, the contents of the autoclave were discharged from the bottom thereof. The unreacted propylene was then steam-stripped. 0.20% by weight of 4,4′-thio-bis-(tert-butyl-2-methylphenol), known under the trademark Santowhite Crystals, was then added to the terpolymer and the resulting mixture homogenized in a roller mixer.

450 grams of a terpolymer were thus obtained which had the following characteristics:

Propylene: 36.0% by weight
MTHI: 4.4% by weight
Mooney viscosity, ML (1+4) 100° C.: 58.0
Intrinsic viscosity in tetrahydronaphthalene (Tetralin) at 135° C.: 1.8 dl./g.

The terpolymer was added in the several concentrations shown in Table 1 (Compositions B, C and D) to a 50:50 (by weight) blend of natural rubber (smoked sheet) and butadiene-styrene rubber SBR 1502, marketed by the Polymer Corporation under the trademark Krylene NS. This mixture was thoroughly mixed in a roller mixer, at temperatures ranging between 100 and 120° C. while adding the ingredients indicated hereinbelow. The sulfur and the accelerators were added last, after first cooling to room temperature (20–25° C.).

The formulation is as follows:

| Components: | Parts by wt. |
|---|---|
| Unsaturated rubber + terpolymer | 100 |
| Carbon black FEF | 30 |
| Naphthenic Oil (Circo Light of Sunoco Co.) | 5 |
| ZnO | 5 |
| Stearic acid | 1.5 |
| Benzothiazolyldisulphide (MBTS) | 0.5 |
| Diphenylguanidine | 0.35 |
| Sulfur | 1.5 |

The mixture was vulcanized in a press at 165° C. for 15 minutes. Some samples were subjected to ozone action under 20% elongation (Ozone concentration: 10 p.p.m.) according to method A of ASTM–D–518/61. The evaluation of the resistance against ozone was effected by measuring the elapsed time until the first crack or fissure becomes visible to the naked eye and by judging the appearance of the surface after a pre-fixed period of exposure had elapsed.

Adhesion tests, according to ASTM–D–413/39 standards (1965-Machine Test or "Peeling Test"), in which adhesion to a composition not containing ethylene-propylene terpolymer was measured, were also carried out on the vulcanized product. The results of these tests are reported in Table I (compositions A, B, C and D).

Example 2

A terpolymer was prepared using the same procedure as that of Example 1, 2,200 grams of this terpolymer were admixed in a closed Banbury type mixer with 0.2% by weight of alpha-dicumyl peroxide, at a temperature of from about 60° to 70° C. After mixing, the mixture was heated in the same mixer at 200° C. for 7 minutes, so as to decompose all of the peroxide.

After this treatment, the terpolymer had the following characteristics:

MTHI: 4.0% by weight
Mooney viscosity ML (1+4) 100° C.: 90.0
Intrinsic viscosity in tetrahydronaphthalene at 135° C.: 2.0 dl./g.

The terpolymer was then added to a 50:50 mixture of natural rubber (smoked sheet) and butadiene-styrene rubber (SBR-1502). A vulcanized composition was prepared under the same operational conditions and using the same ingredients as those set forth in Example 1. Samples of this vulcanized composition were subjected to the same tests as described in Example 1. The results, recorded in Table I (Composition E), showed a markedly improved resistance to ozone.

Example 3

The same procedure as the described in Example 2 was followed, but using a smaller amount of alpha-dicumyl peroxide (0.15) in the treatment of the terpolymer. The product thus obtained had a lower Mooney viscosity and appeared to be less reticulated; however, it was suitable for imparting an excellent resistance against ozone.

The characteristics of the treated terpolymer were as follows:

MTHI: 4.0% by weight
Mooney viscosity, ML(1+4) 100° C.: 85.0
Intrinsic viscosity in Tetralin at 135° C.: —2.0 dl./g.

The results of the tests carried out on the vulcanized compositions of an unsaturated rubber with the modified terpolymer are recorded in Table I (composition F).

Example 4

Into a 20 liter autoclave (having a usable capacity of 15 liters) which was provided with a stirrer and constant temperature jacket, were fed in continuously ethylene, propylene and 2-ethylidene-5-norbornene, hereinbelow referred to as ENB, together with the catalytic system of Example 1. Through the bottom of the autoclave a suspension of the terpolymer in liquid propylene was continuously discharged into a collecting tank containing water at 100° C. (such suspension containing unconverted monomers), at such a rate as to maintain the volume of the reaction mixture in the autoclave constant. The unconverted monomers were distiled over and the terpolymer was extracted in the form of an aqueous dispersion.

The polymerization was carried out under the following operational conditions:

Temperature: −10° C.
Pressure: 5.6 atm. (absolute)
Residence time: 86 minutes

Addition rate

Ethylene: 0.69 kg./hr.
Proplene: 4.95 kg./hr.
ENB: 0.096 kg./hr.
$AlEt_2Cl$: 11.1 g./hr.
$V(Ac)_3$: 1.53 g./hr.

A terpolymer was obtained which had the following characteristics:

Propylene: 31% by weight
ENB: 8.0% by weight
Mooney viscosity, ML(1+4) 100° C.: 14
Intrinsic viscosity in Tetralin at 135° C.: 1 dl./g.

To 2,200 grams of the terpolymer thus prepared, were added, in a closed Banbury type mixer, 7.7 grams (0.35%) of alpha-dicumyl peroxide at a temperature of from about 60° to 70° C. This mixture was then heated in the same mixer at 200° C. for 7 minutes, to decompose the peroxide.

After this treatment, the characteristics of the terpolymer were as follows:

ENB: 7.8% by weight
Mooney viscosity, ML(1+4) 100° C.: 60
Intrinsic viscosity in Tetralin at 135° C.: 1.6 dl./g.

Thereupon a mix was prepared which contained the terpolymer thus treated, a natural rubber, a butadiene-styrene rubber and the other ingredients as set forth in Table 1 and in Example 1. After this, vulcanization of the mixture was carried out using the same procedure as that described in Example 1.

The results of the tests carried out on vulcanized test samples obtained from this composition, show a considerable improvement of the resistance against ozone (see Table 1, compositions G and H).

Example 5

500 grams of a commercial terpolymer, containing 1,4-trans-hexadiene as the third monomer and having the following characteristics:

Propylene: 40.5% by weight
1-4 hexadiene: 5.2% by weight
Mooney viscosity, ML(1+4) 100° C.: 54 were treated for 30 minutes at 165° C. with 1.5 g. of alpha-dicumyl peroxide. A product was thus obtained which had the following characteristics:

1,4 hexadiene: 2.9% by weight
Mooney viscosity, ML(1+4) 100° C.: 117

The results of the tests caried out on vulcanized compositions, obtained as described in Example 1, are reported in Table I (compositions K and L).

oxide; and (B) mixing (1) the reacted terpolymer in an amount not exceeding about 30% by weight with (2) correspondingly at least about 70% by weight of an unsaturated elastomer selected from the group consisting of natural rubber, polybutadiene, polyisoprene, butadiene-styrene copolymers, butadiene - acrylonitrile copolymers, polychloroprene, copolymers of butadiene with an ester of an unsaturated carboxylic acid and mixtures thereof.

2. The process of claim 1, wherein said terpolymer is ethylene/propylene/6-methyl-4,7,8,9-tetrahydroindene.

3. The process of claim 1, wherein said terpolymer is ethylene/propylene/2-ethylidene-5-norbornene.

4. The process of claim 1, wherein said terpolymer is ethylene/propylene/1,4-transhexadiene.

5. The process of claim 1, wherein said organic peroxide is selected from the group consisting of alpha-alpha'-dicumylperoxide, alpha - cumyl - tert - butyl peroxide and alpha - alpha' - bis - tert - butyl - peroxy)-di-isopropylbenzene.

6. The process of claim 1, wherein said elastomer is a mixture of 50% by weight of natural rubber and 50% by weight of a butadiene-styrene copolymer.

7. A vulcanizable elastomeric composition obtained by the process of claim 1.

8. The composition of claim 7, wherein said terpolymer is ethylene/propylene/6 - methyl - 4,7,8,9 - tetrahydroindene.

9. The composition of claim 7, wherein said terpolymer is ethylene/propylene/2-ethylidene-5-norbornene.

10. The composition of claim 7, wherein said terpolymer is ethylene/propylene/1,4-transhexadiene.

11. The composition of claim 7, wherein said organic peroxide is selected from the group consisting of alpha-alpha' - dicumylperoxide, alpha - cumyl - tert - butyl peroxide and alpha - alpha' - bis - (tert - butyl - peroxy)-di-isopropylbenzene.

12. The composition of claim 7, wherein said elastomer is a mixture of 50% by weight of natural rubber and 50% by weight of a butadiene-styrene copolymer.

13. Shaped articles, which are resistant to air oxidation, comprising the vulcanized elastomeric composition of claim 7.

14. The shaped articles of claim 13 in the form of tires, conveyor belts, transmission belts, hoses or gaskets.

TABLE I

| | Compositions | | | | | | | | | |
|---|---|---|---|---|---|---|---|---|---|---|
| | A | B | C | D | E | F | G | H | K | L |
| Elastomer composition: | | | | | | | | | | |
| Natural rubber | 50 | 42.5 | 40 | 35 | 40 | 40 | 40 | 40 | 40 | 40 |
| SBR 1502 | 50 | 42.5 | 40 | 35 | 40 | 40 | 40 | 40 | 40 | 40 |
| (1) Terpolymer (nt) | | 15 | 20 | 30 | | | | | | |
| (2) Terpolymer (t) | | | | | 20 | | | | | |
| (3) Terpolymer (t) | | | | | | 20 | | | | |
| (4) Terpolymer (nt) | | | | | | | 20 | | | |
| (4) Terpolymer (t) | | | | | | | | 20 | | |
| (5) Terpolymer (nt) | | | | | | | | | 20 | |
| (5) Terpolymer (t) | | | | | | | | | | 20 |
| Time until appearance of cracks (in minutes). | 5 | 30 | 65 | >600 | >600 | >600 | 45 | 340 | 16 | >1,200 |
| Aspect of the test piece after 20 hours' exposure | mf | mf | mf | nf | nf | nf | mf | qf | mf | nf |
| Adhesion with respect to mix A (kg./cm.) | | 28 | 26 | 5 | 28 | nm | nm | nm | nm | nm |

nt=not treated; t=treated (with peroxide in accordance with the invention); mf=many cracks; nf=no cracks; qf=some cracks; nm=not measured. (The values set forth in the table refer to parts by weight unless otherwise specified.)

Having thus described our invention, what we desire to secure by Letters Patent and hereby claim is:

1. A process for producing a vulcanizable elastomeric composition, said process comprising (A) reacting (1) an ethylene/alphaolefin/diene terpolymer, wherein the diene is selected from the group consisting of 1,4-trans-hexadiene, 2 - methylene - 5 - norbornene, 6 - methyl-4,7,8,9 - tetrahydroindene and 5,6 - dimethyl - 4,7,8,9-tetrahydroindene with (2) from about 0.01% to 0.5% by weight based on said terpolymer of an organic peroxide at a temperature sufficient to decompose said per-

References Cited

UNITED STATES PATENTS

| | | | |
|---|---|---|---|
| 3,329,662 | 7/1967 | De La Mare | 260—88.2 |
| 3,419,639 | 12/1968 | Gentile | 260—889 |
| 3,492,370 | 1/1970 | Wirth | 260—889 |

SAMUEL H. BLECH, Primary Examiner

J. SEIBERT, Assistant Examiner

U.S. Cl. X.R.

260—889

PO-1050
(5/69)

UNITED STATES PATENT OFFICE
CERTIFICATE OF CORRECTION

Patent No. 3,658,732 Dated April 25, 1972

Inventor(s) GIULIANO BALLINI and LUCIANO BALDI

It is certified that error appears in the above-identified patent and that said Letters Patent are hereby corrected as shown below:

Column 3, line 4: "exhibited" should read -- exhibit --. Column 4, line 9: "Example 1," should read -- Example 1. --; line 33: "as the" should read -- as that --; line 61: "distiled" should read -- distilled --. Column 5, line 44: "caried" should read -- carried --; line 71: After "2-methylene-5-norbornene" insert -- 2-ethylidene-5-norbornene, 2-methallyl-5-norbornene, --. Column 6, line 18: "bis-tert-" should read -- bis-(tert- --.

Signed and sealed this 2nd day of January 1973.

(SEAL)
Attest:

EDWARD M. FLETCHER, JR.
Attesting Officer

ROBERT GOTTSCHALK
Commissioner of Patents

'R